P. J. R. POSTEL-VINAY.
TAILPIECE FOR AEROPLANES.
APPLICATION FILED DEC. 19, 1918.
1,373,759.
Patented Apr. 5, 1921.
2 SHEETS—SHEET 1.
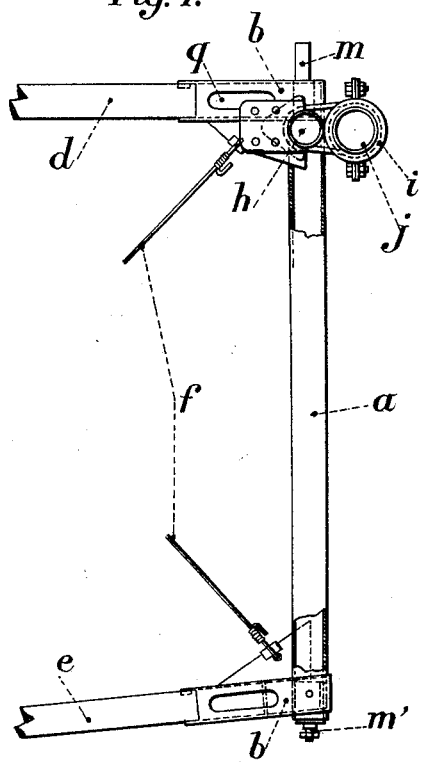
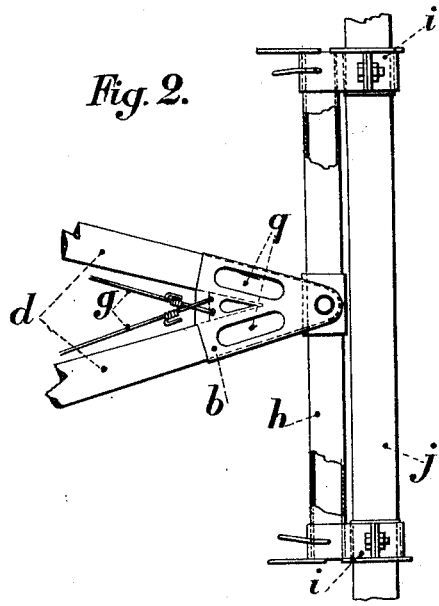
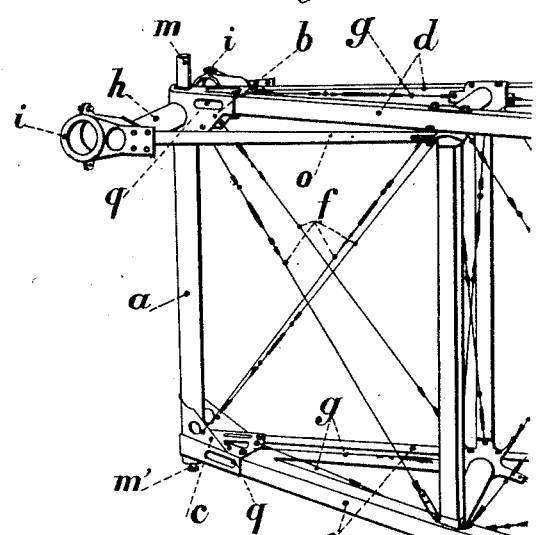

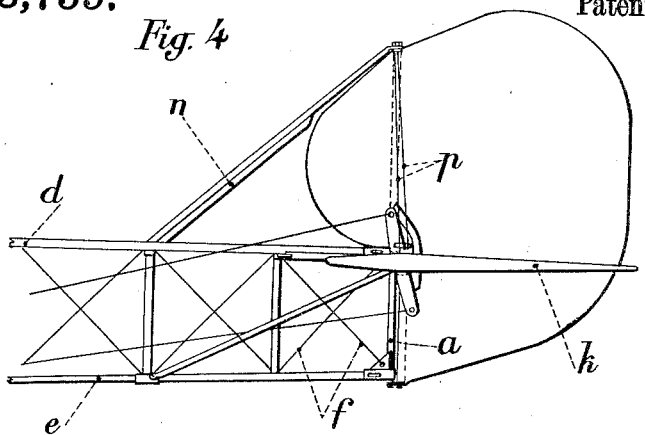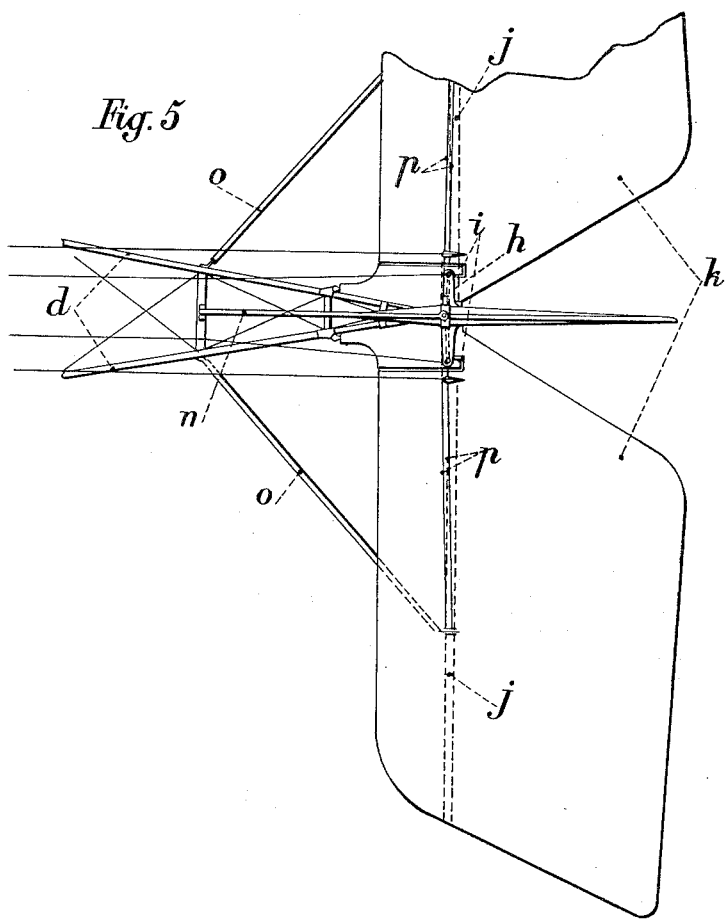

UNITED STATES PATENT OFFICE.

PIERRE JEAN RENÉ POSTEL-VINAY, OF PARIS, FRANCE, ASSIGNOR TO SOCIETE DES MOTEURS SALMSON (SYSTEME CANTON-UNNE), OF BILLANCOURT, FRANCE.

TAILPIECE FOR AEROPLANES.

1,373,759.      Specification of Letters Patent.      Patented Apr. 5, 1921.

Application filed December 19, 1918. Serial No. 267,545.

*To all whom it may concern:*

Be it known that I, PIERRE JEAN RENÉ POSTEL-VINAY, citizen of the Republic of France, residing at 46 Boulevard de La Tour-Maubourg, Paris, Seine, in the Republic of France, have invented new and useful Improvements in Tailpieces for Aeroplanes, of which the following is a specification.

This invention has for its object to provide an improved tail-piece for aeroplanes, which is constituted essentially by a vertical tube serving as a support for the pivotal members of the horizontal and vertical rudders, and forming the end upright of the fuselage to which it is connected by simply engaging the upper and lower longitudinals into two sockets welded to the said tube by autogenous welding and each formed of a suitably cut and folded metal plate.

The connection to the fuselage is assured by the pull of the stay wires attached to the sockets.

This manner of fixing without bolts avoids the reduction of the section of the longitudinals at their ends, while giving the desired strength to the assemblage.

In the accompanying drawings given by way of example:

Figures 1, 2 and 3 are respectively a side elevation, a plan and a perspective view of a tail-piece in accordance with this invention.

Figs. 4 and 5 are respectively a side elevation and a plan showing the mounting of the horizontal and vertical rudders on the tail-piece.

On reference to the drawings it will be perceived that two sockets *b* and *c* are welded by autogenous welding on the tube *a* that constitutes the end upright of the fuselage. These sockets are formed of metal plates suitably folded and cut, into which the upper longitudinals *d* and lower longitudinals *e* are engaged, and to which the stay wires *f* and *g* are fixed that constitute the connection to the fuselage.

A tube *h* welded by autogenous welding, extends through the tube *a* at right angles to the axis of the latter. This tube *h* carries two bearings *i* for the tubular shaft *j* of the horizontal rudder *k*. (The shaft *j* is not shown in Fig. 3).

The vertical rudder *l* is pivoted on the tube *a* by means of an arrangement of pivots *m* and *m'*.

The rigidity of the mounting of the rudders *k* and *l* is assured by a triangular bracing comprising a tube *n*, two tubes *o* and stay wires *p*.

The sockets *b* and *c* may comprise recesses *q* for the purpose of lightening the whole.

Having now described my invention, what I claim as new and desire to secure by Letters Patent is:

1. A tail-piece for aeroplanes comprising in combination an end upright, metal fittings fixed to the ends of said upright, these fittings being each made in one piece and having each two separate straight recesses independent from each other, each having the shape of the section of the longitudinals of the fuselage, said recess being arranged according to a V in which the ends of the upper and lower longitudinals of the fuselage may be engaged and stay wires connecting the fitting to the fuselage.

2. A tail-piece for aeroplanes comprising in combination an end upright, metal fittings fixed at the ends of said upright, said fittings being each made in one piece and having each two separate recesses arranged according to a V in which the ends of the upper and lower longitudinals of the fuselage may be engaged, stay wires connecting said fittings to the fuselage, and means upon said upright for supporting the horizontal and vertical rudders so that they may be capable of pivoting.

3. A tail-piece for aeroplanes comprising in combination an end upright, metal fittings fixed at the ends of said upright, said fittings being each made in one piece and having each two separate recesses arranged according to a V in which the ends of the upper and lower longitudinals of the fuselage may be engaged, stay wires connecting said fittings to the fuselage, a transverse horizontal support fixed to the end upright, bearings carried by the ends of said support, an axle journaled on said bearings and upon which the horizontal rudder may be fixed, and vertical pivots provided for at the upper and lower end of the upright and upon which the vertical rudder is adapted to be pivoted.

4. A tail-piece for aeroplanes, comprising in combination an end upright, metal fittings fixed at the ends of said upright and constructed in such a manner that the ends of the upper and lower longitudinals of the fuselage may be engaged in said fittings, means connecting said fittings to the fuselage, a transverse horizontal support fixed to the end upright, bearings carried by the ends of said support, an axle journaled on said bearings and upon which the horizontal rudder is adapted to be fixed, vertical pivots provided for at the upper and lower end of the upright and upon which the vertical rudder is adapted to be pivoted, lateral struts connecting the said axle of the horizontal rudder to the fuselage, stay wires connecting said axle to said upper pivot and a strut arranged in the longitudinal plan of the apparatus and connecting said upper pivot to the fuselage.

In testimony whereof I have signed my name to this specification.

PIERRE JEAN RENÉ POSTEL-VINAY.